United States Patent
Baba

(10) Patent No.: US 10,244,143 B2
(45) Date of Patent: Mar. 26, 2019

(54) IMAGE PROCESSING APPARATUS, IMAGE PROCESSING METHOD, AND RECORDING MEDIUM

(71) Applicant: Hiroyuki Baba, Kanagawa (JP)

(72) Inventor: Hiroyuki Baba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

(21) Appl. No.: 15/384,768

(22) Filed: Dec. 20, 2016

(65) Prior Publication Data

US 2017/0187915 A1    Jun. 29, 2017

(30) Foreign Application Priority Data

Dec. 28, 2015  (JP) .................. 2015-255842

(51) Int. Cl.
*G06K 15/02* (2006.01)
*H04N 1/387* (2006.01)

(52) U.S. Cl.
CPC ....... *H04N 1/3875* (2013.01); *G06K 15/1825* (2013.01); *G06K 15/1827* (2013.01); *G06K 15/1842* (2013.01); *H04N 1/3876* (2013.01); *H04N 2201/0094* (2013.01)

(58) Field of Classification Search
USPC ........................................ 358/1.14
See application file for complete search history.

(56) References Cited

U.S. PATENT DOCUMENTS

| | | | |
|---|---|---|---|
| 5,488,488 A * | 1/1996 | Shimizu | H04N 1/00129 345/536 |
| 6,701,002 B1 * | 3/2004 | Karube | H04N 17/002 348/E17.002 |
| 2003/0090742 A1 | 5/2003 | Fukuda et al. | |
| 2004/0105593 A1 | 6/2004 | Baba | |
| 2008/0218800 A1 | 9/2008 | Baba | |
| 2009/0109496 A1 | 4/2009 | Baba | |
| 2009/0219579 A1 | 9/2009 | Baba | |
| 2010/0110499 A1 | 5/2010 | Baba | |
| 2010/0277777 A1 * | 11/2010 | Baba | H04N 1/0402 358/505 |
| 2012/0274950 A1 * | 11/2012 | Shoji | G06K 15/1223 358/1.2 |
| 2015/0319335 A1 | 11/2015 | Baba et al. | |

FOREIGN PATENT DOCUMENTS

| | | |
|---|---|---|
| JP | 6-087249 | 3/1994 |
| JP | 2004-046626 | 2/2004 |
| JP | 2008-067036 | 3/2008 |
| JP | 2009-063868 | 3/2009 |
| JP | 2014-165842 | 9/2014 |

* cited by examiner

*Primary Examiner* — Neil R McLean
*Assistant Examiner* — Darryl V Dottin
(74) *Attorney, Agent, or Firm* — Harness, Dickey & Pierce, P.L.C.

(57) ABSTRACT

An image processing apparatus scans an image of a document into image data, splits the image data into a plurality of areas to generate split image data, magnifies the split image data, and aggregates the magnified split image data at least based on a font size of one or more characters included in the split image data.

13 Claims, 17 Drawing Sheets

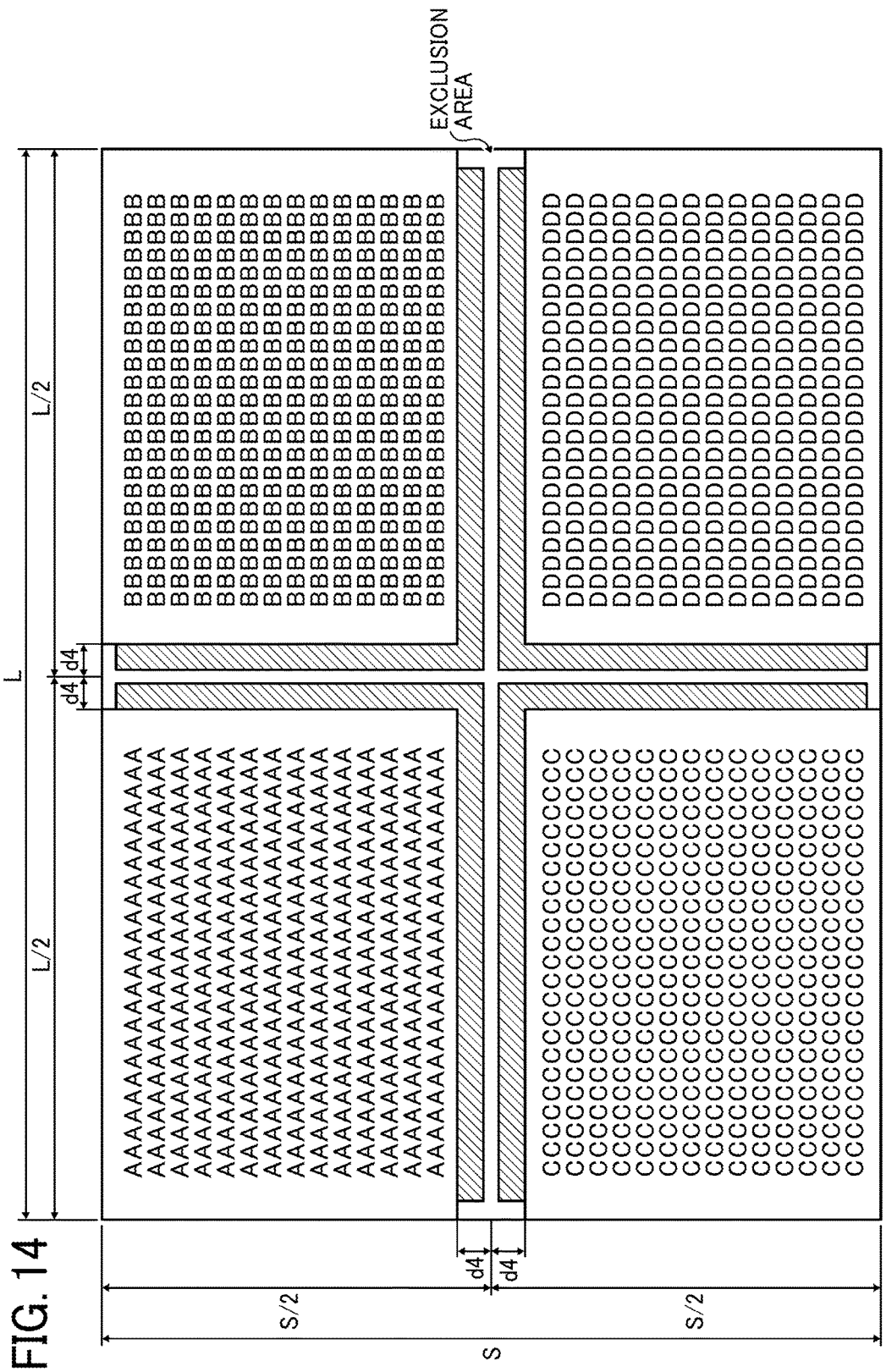

FIG. 15

| RELATED ART | DOCUMENT | PRESENT DISCLOSURE |
|---|---|---|
| LOWER LIMIT OF FONT SIZE FOR PRINTING = 10.5 PT | | LOWER LIMIT OF FONT SIZE FOR PRINTING = 10.5 PT |
| LOWER LIMIT OF FONT SIZE FOR PRINTING ≤ FONT SIZE FOR PRINTING < DOCUMENT FONT SIZE | | LOWER LIMIT OF FONT SIZE FOR PRINTING ≤ FONT SIZE FOR PRINTING |

PRINT P.1  12 PT     DOCUMENT P.1  18 PT     PRINT P.1  12 PT

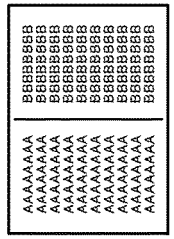 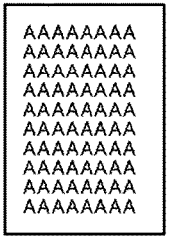 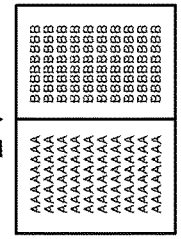

DOCUMENT P.2  18 PT     PRINT P.2  11 PT

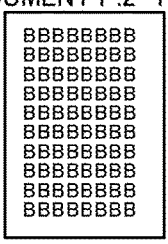 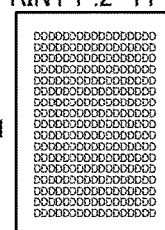

PRINT P.2  8 PT     DOCUMENT P.3  8 PT     PRINT P.3  11 PT

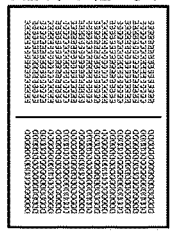 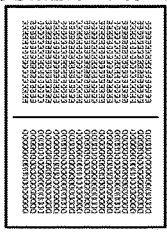 DOCUMENT CHARACTERS ARE ALREADY SMALL 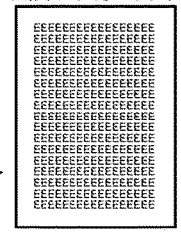

PRINT P.4  8 PT     DOCUMENT P.4  8 PT     PRINT P.4  11 PT

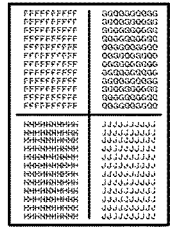 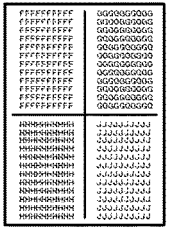 DOCUMENT CHARACTERS ARE ALREADY SMALL 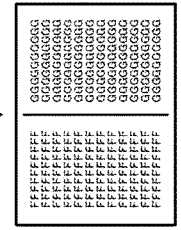

PRINT P.5  11 PT

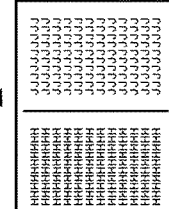

FIG. 16A
| FIG. 16 | FIG. 16A |
| | FIG. 16B |
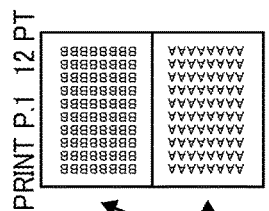
DOCUMENT P.1 18 PT
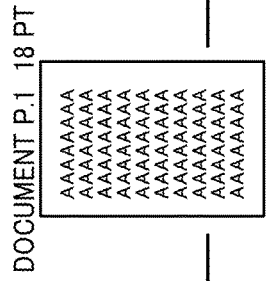
DOCUMENT P.2 18 PT
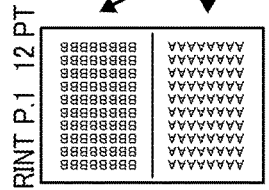
DOCUMENT P.3 18 PT
RELATED ART
LOWER LIMIT OF FONT SIZE FOR PRINTING = 10.5 PT
LOWER LIMIT OF FONT SIZE FOR PRINTING ≤ FONT SIZE FOR PRINTING < DOCUMENT FONT SIZE
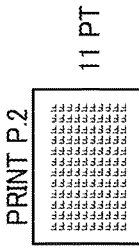
PRINT P.1 12 PT
PRESENT DISCLOSURE
LOWER LIMIT OF FONT SIZE FOR PRINTING = 10.5 PT
LOWER LIMIT OF FONT SIZE FOR PRINTING ≤ FONT SIZE FOR PRINTING
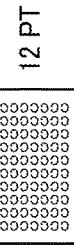
PRINT P.1 12 PT
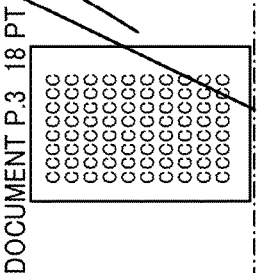
PRINT P.2
11 PT
12 PT

IMAGE PROCESSING APPARATUS, IMAGE PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2015-255842, filed on Dec. 28, 2015, in the Japan Patent Office, the entire disclosure of which is hereby incorporated by reference herein.

BACKGROUND

Technical Field

The present disclosure relates to an image processing apparatus, an image processing method, and a non-transitory recording medium.

Description of the Related Art

Demands for reducing output on paper are increasing more than ever for the sake of environmental protection and cost reduction. In the future, office workers will be aging more and more, and an older worker-friendly office environment will be desired more than ever. To reduce paper output, aggregate printing is performed. Such aggregate printing involves font size reduction, which makes it more difficult for the older worker, among whom a higher proportion has weaker eyesight, to read the characters. In view of the circumstances, there have already been known technologies for aggregate printing in which the font size does not become smaller than a designated font size.

SUMMARY

Example embodiments of the present invention include an image processing apparatus including: an image scanner to scan an image of a document into image data; and circuitry to split the image data into a plurality of areas to generate split image data, magnify the split image data, and aggregate the magnified split image data, at least based on a font size of one or more characters included in the split image data.

Example embodiments of the present invention include an image processing method performed by the image processing apparatus, and a recording medium storing a control program.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 14 illustrates an exclusion area in a determination area in the case of four-page contraction;

FIG. 15 is an illustration for describing an image formation result according to the embodiment; and FIGS. 16A and 16B are illustrations for describing an image formation result according to the embodiment.

Figure 1:
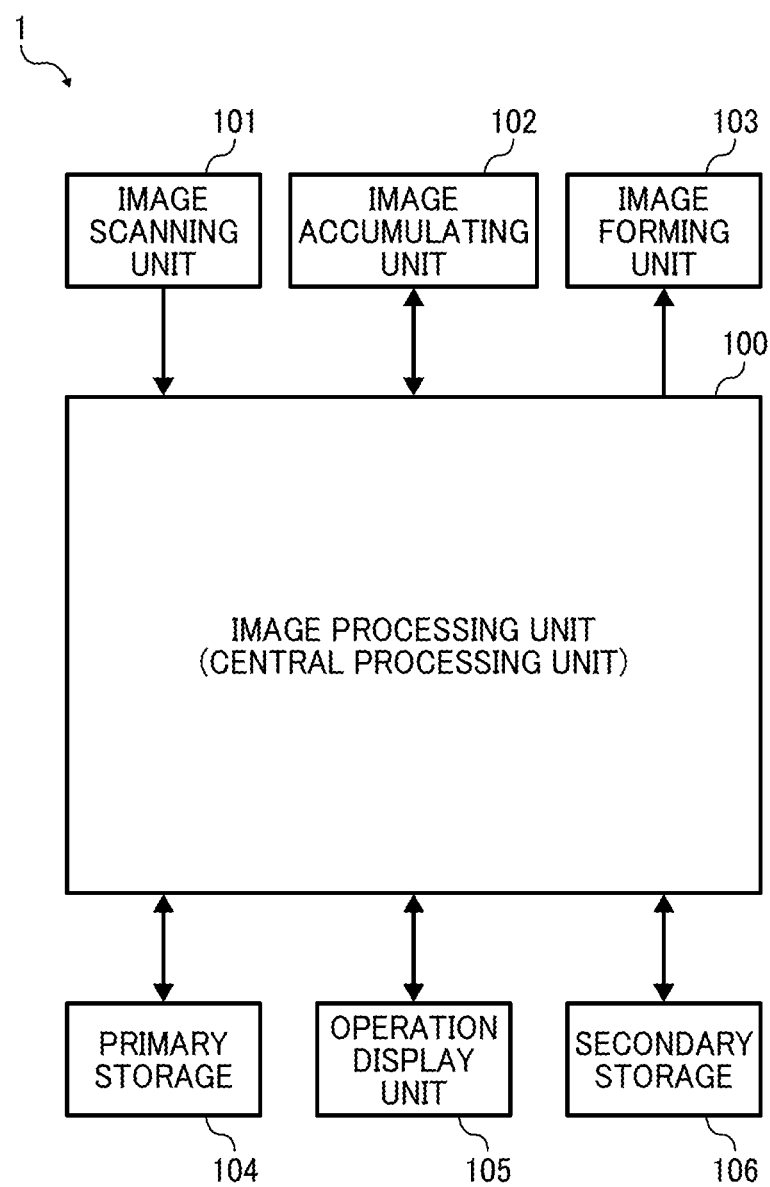
FIG. 1 is a block diagram illustrating an exemplary hardware configuration according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The following disclosure relates to a process of optically scanning an image of a document (image scanning) and outputting the read image. The term "output" here includes, for example, generation of a facsimile image, in addition to printing.

For an aggregate document, an image area of each of pages constituting the aggregate document is split as one document, and then aggregate printing is performed to output the result. Therefore, even when a to-be-scanned document is in an aggregate-printed state where characters are already small, the characters can be made easier to read.

An embodiment of the present disclosure described above will be described in detail using the following drawings.

FIG. 1 illustrates an exemplary hardware configuration of an image processing apparatus according to the embodiment. An image processing apparatus 1 is a so-called multi-function peripheral (MFP), intended to illustrate an example of the embodiment, and does not require the image processing apparatus 1 to be an MFP. As illustrated in FIG. 1, the image processing apparatus 1 includes an image processing unit 100, an image scanning unit 101, an image accumulating unit 102, an image forming unit 103, a primary storage 104, an operation display unit 105, and a secondary storage 106.

The image scanning unit 101 includes an optical image scanning device with a flat-head scanner or an auto-document feeder, for example. A "document" read in the embodiment includes one or more pages, which may possibly include an "aggregate document". An "aggregate document" refers to a document obtained by aggregating a plurality of pages of a document, such as two pages, four pages, eight pages, or nine pages, and printing the aggregated pages on one sheet of paper.

The image processing unit 100 is a calculation and processing unit of the image processing apparatus 1. The image processing unit 100 can be implemented by a central processing unit (CPU) or a dedicated application-specific integrated circuit (ASIC). The operation of the image processing unit 100 will be described in detail using the flowchart illustrated in FIG. 2 and so forth. The primary storage 104 is a working memory of the image processing unit 100. The primary storage 104 may be a volatile memory.

The image accumulating unit 102 is a secondary memory device of the image processing apparatus 1. The image accumulating unit 102 is implemented by a hard disk drive or the like. The image accumulating unit 102 is non-volatile. The operation display unit 105 is a man-machine interface of the image processing apparatus 1. The operation display unit 105 is implemented by a liquid crystal panel or the like. The operation display unit 105 informs the operator of the image processing apparatus 1 of the apparatus status or informs the image processing unit 100 of an instruction input by the operator.

In contrast to the primary storage 104, the secondary storage 106 is a non-volatile memory of the image processing unit 100. The secondary storage 106 may use the same hardware device as the image accumulating unit 102. The secondary storage 106 stores the lower limit of the smallest font size for printing. The secondary storage 106 also stores software programs such as firmware.

The image forming unit 103 performs printing based on image data output from the image processing unit 100. The printing method is not particularly limited. For example, an electrophotographic method is adoptable.

The image processing apparatus 1 according to the embodiment reads a document including an aggregate document with the use of the image scanning unit 101, applies image processing according to the embodiment to the document, and outputs the processed document from the image forming unit 103. This processing is the so-called copying.

In steps in each process described below, it is assumed that the operator uses the operation display unit 105 to give a copy instruction in an "aggregate mode". Image processing according to the embodiment is not necessarily performed in the "aggregate mode". However, because the font size for printing in the aggregate mode tends to be small, the technical significance of the technical idea of the present application can be easily clarified. Thus, it is assumed that printing is performed in the "aggregate mode".

Figure 2:
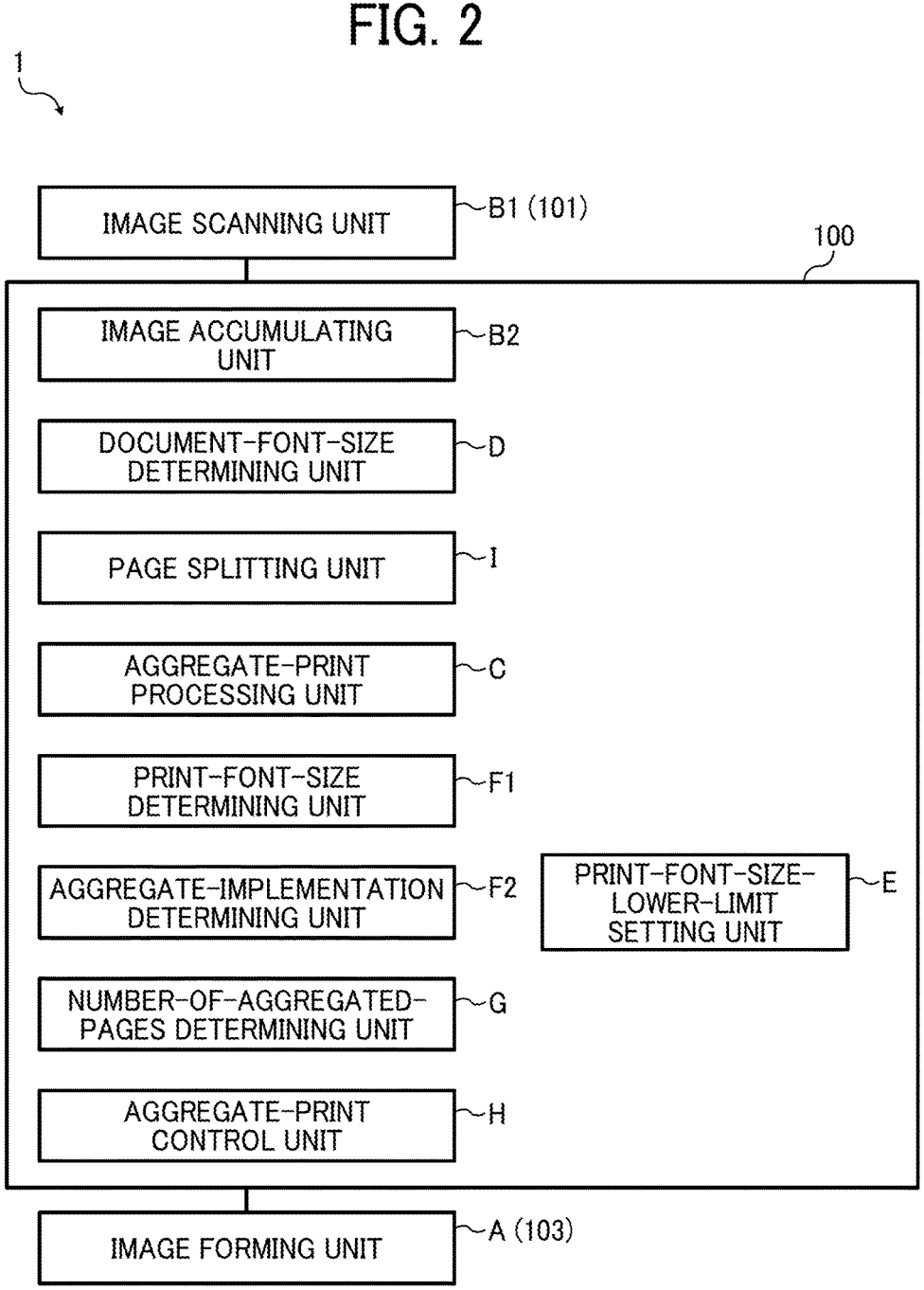
FIG. 2 is a block diagram illustrating a functional configuration according to the embodiment.

The software programs such as firmware stored in the secondary storage 106 are read by the image processing unit 100 and executed in the primary storage 104, thereby constituting the functional blocks illustrated in FIG. 2.

FIG. 2 is a block diagram illustrating the functional configuration of the image processing apparatus 1 according to the embodiment. As illustrated in FIG. 2, the image processing apparatus 1 includes an image scanning unit (B1), an image accumulating unit (B2), a document-font-size determining unit (D), a page-splitting unit (I), an aggregate-print processing unit (C), a print-font-size determining unit (F1), an aggregate-implementation determining unit (F2), a number-of-aggregated-pages determining unit (G), an aggregate-print control unit (H), and an image forming unit (A).

At first, the image scanning unit (B1) scans a document to convert it to one or more digital images. The image scanning unit (B1) converts the entire document to one or more digital images, and holds the digital image(s) as one or more accumulated images in the image accumulating unit (B2). The document-font-size determining unit (D) determines the smallest character among characters used in the document per accumulated image, which accumulates one page of the document.

When a scanned and accumulated image is already an aggregate document on which a plurality of pages of a document are aggregated and printed on one sheet of paper, the page-splitting unit (I) cuts out an image area corresponding to each of the pages constituting the aggregate document. The page-splitting unit (I) subjects the cut-out image to magnification such that the split image will be of the same size as one scanned image, and holds the magnified image in the image accumulating unit (B2). Each one-page accumulated image cut out from the aggregate document has a larger font size than that of the aggregate document. This or these accumulated images are again subjected to aggregate printing later such that the font size will not be smaller than a reference font size, thereby realizing an aggregate print that is easier to read than that in the case of the related art.

From the images accumulated in the image accumulating unit (B2), a plurality of aggregate print images having different numbers of aggregated pages are generated, and the aggregate print images are temporarily stored in the image accumulating unit (B2). For the convenience of explanation, a non-aggregate document is regarded as one type of aggregate print image where a document having one page is aggregated into one sheet. The print-font-size determining unit (F1) determines the smallest font size of each aggregate print image and holds this value as the smallest font size for printing.

The user has set in advance the font size lower limit of a print image via an operation panel. This font size lower limit is held as the lower limit of the smallest font size for printing in a print-font-size-lower-limit setting unit (E). The aggregate-implementation determining unit (F2) compares the aforementioned smallest font size for printing with the smallest font size for printing, which is the result obtained by the print-font-size determining unit (F1), and determines that "aggregation is possible" when "the smallest font size for printing" >"the lower limit of the smallest font size for printing". This processing is performed for all the aggregate print images generated previously.

The number-of-aggregated-pages determining unit (G) holds, among the aggregate print images that are determined by the aggregate-implementation determining unit (F2) as "aggregation is possible", the maximum number of aggregated pages as the maximum number of aggregated pages. The aggregate-print control unit (H) holds an aggregate print image having the maximum number of aggregated pages in the image accumulating unit (B2), and discards all the other aggregate print images. The image forming unit (A) forms the print image, held in the image accumulating unit (B2), on recording paper.

Figure 3:
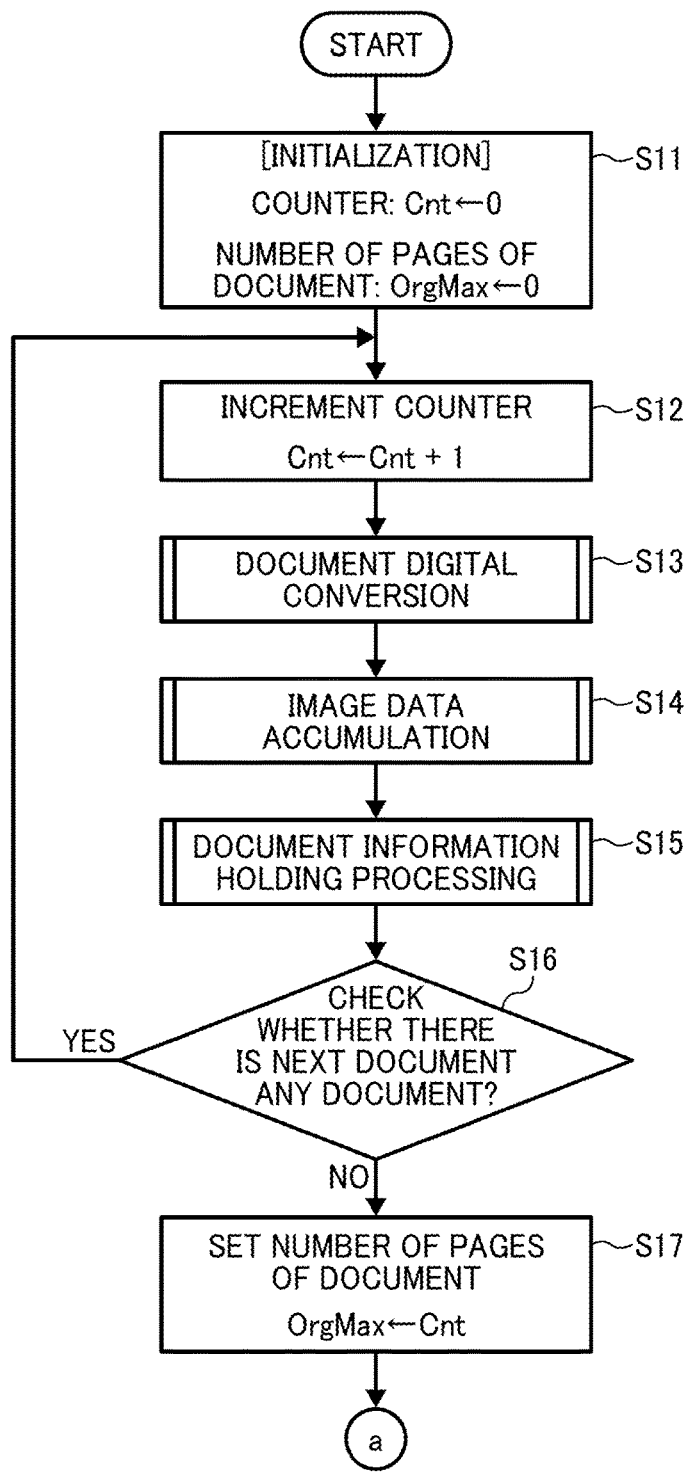
FIG. 3 is a flowchart illustrating a process of scanning a document and accumulating one or more digital images in an image accumulating unit.

The flowchart illustrated in FIG. 3 illustrates steps in the specific details of a process performed by the functional blocks, namely, the image scanning unit (B1) and the image accumulating unit (B2) illustrated in FIG. 2. In initialization S11, Cnt, which is a counter for counting the number of pages of a document, and OrgMax, which is for holding the total number of pages of a scanned paper document, are initialized. In counter-increment processing S12, the counter Cnt is incremented by one in the beginning before the process is started.

In document digital conversion S13, the document is converted to digital image data by photoelectric conversion. At this time, the main scanning size and the sub scanning size of the document, and the scanning resolution are held as information on the image. In image accumulation S14, the scanned digital image is held in an external storage device such as a memory or a hard disk drive.

In document information holding processing S15, the document's size and page number detected at the time of scanning the document are held as information linked with the accumulated image. In next document checking processing S16, whether there is a next document to read is detected using a sensor of the image scanning device, and if there is such a document, the process returns to the counter-increment processing S12. If there is no next document, the value of the document count value Cnt at that time is held in OrgMax, which is the total number of pages of the scanned document, and the process proceeds to the next processing.

Figure 4:
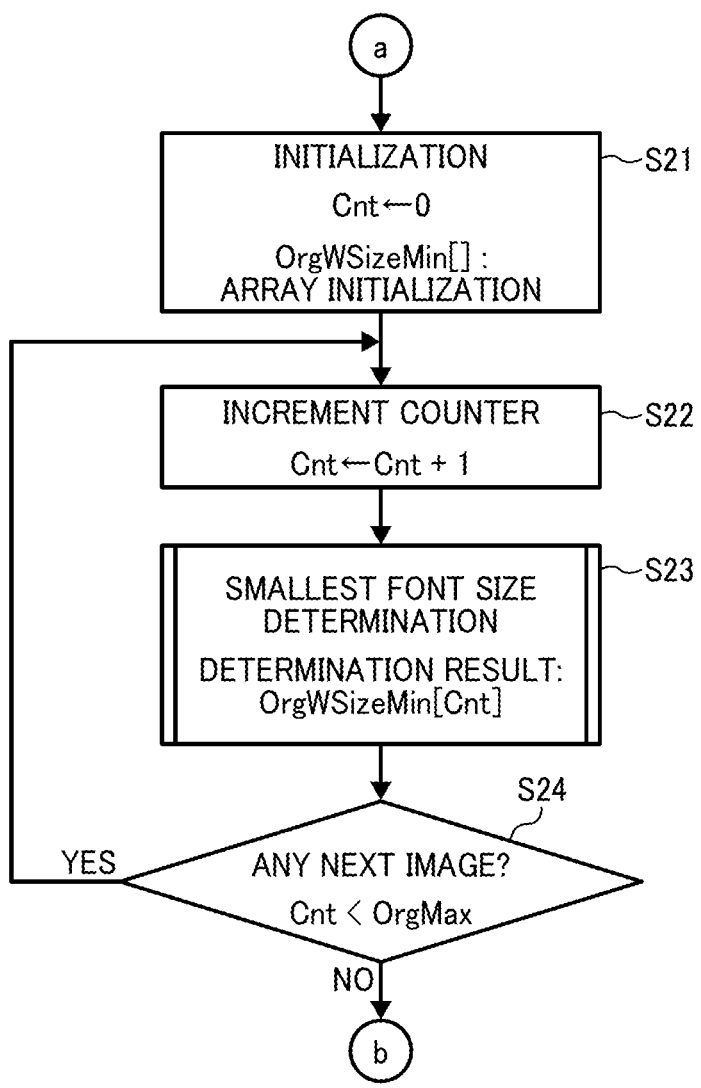
FIG. 4 is a flowchart illustrating a process of determining the smallest character among characters used in the scanned document.

The flowchart illustrated in FIG. 4 illustrates steps in the specific details of a process performed by the document-font-size determining unit (D) illustrated in FIG. 2. In initialization S21, Cnt, which is a counter for counting the number of pages of a document, and OrgWSizeMin[ ], which is an array variable indicating the smallest font size among characters used in one page of the document, are initialized. In counter-increment processing S22, the counter Cnt is incremented by one in the beginning before the process is started.

In smallest-font-size determination S23, the smallest font size in a character portion of a one-page image of the [Cnt]-th page, held in image accumulation S14, is determined, and the determined smallest font size is held in OrgWSizeMin[Cnt], which is a variable linked with the accumulated image. In next document determination S24, it is determined whether there is a next accumulated image to process. When it is determined negative, the process ends; and when it is determined affirmative, the process returns to the counter-increment processing S22.

Figure 5:
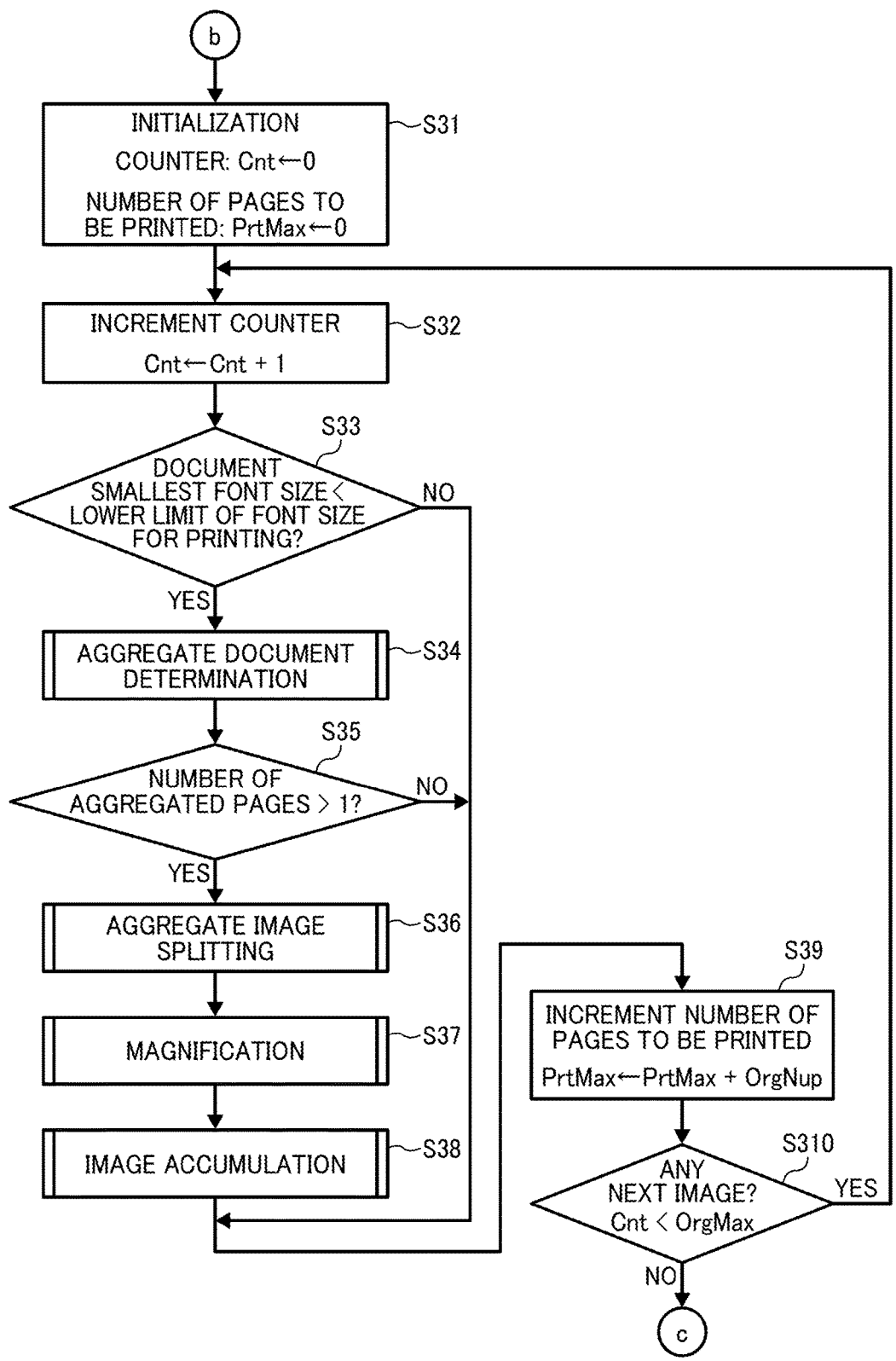
FIG. 5 is a flowchart illustrating a page splitting process in a case in which the scanned document is an aggregate document.

The flowchart illustrated in FIG. 5 illustrates steps in the specific details of a process performed by the page-splitting unit (I) illustrated in FIG. 2. In initialization S31, Cnt, which is a counter for counting the number of pages of a document, and PrintMax, which is the number of pages to be printed, are initialized. In counter-increment processing S32, the counter Cnt is incremented by one in the beginning before the process is started.

In document-font-size determination S33, it is determined whether the smallest font size of characters used in the document is smaller than the predetermined lower limit of the font size for printing. The lower limit of the font size for printing serves as a reference for determining the readability of characters. In the case of determining an aggregate document regardless of the document font size and splitting the aggregate document, it is always determined affirmative in S33.

To determine whether the accumulated image is an aggregate document that is not easy to read, the characteristics of the image are extracted in aggregate document determination S34. As the determination result, OrgNup, which is the number of aggregated pages, is held. For the convenience of explanation, an image other than an aggregate image is also treated as a document whose number of aggregated pages is one.

In aggregate document determination S35, it is determined whether the aggregate document is one that should be subjected to image splitting. When the number of aggregated pages is greater than one, image splitting is performed. When the number of aggregated pages is one (non-aggregate document), no image splitting is performed. In aggregate image splitting at S36, one-page image areas constituting the aggregate document are each cut out.

In magnification at S37, each of the cut-out images is magnified such that the image will be of the same size as one scanned image. In image accumulation at S38, the magnified image obtained in magnification at S37 is held again in the image accumulating unit (B2).

In number-of-pages-to-be-printed increment processing S39, the total number of images to be printed is held. In next document determination S310, it is determined whether there is a next accumulated image to process.

Figure 6:
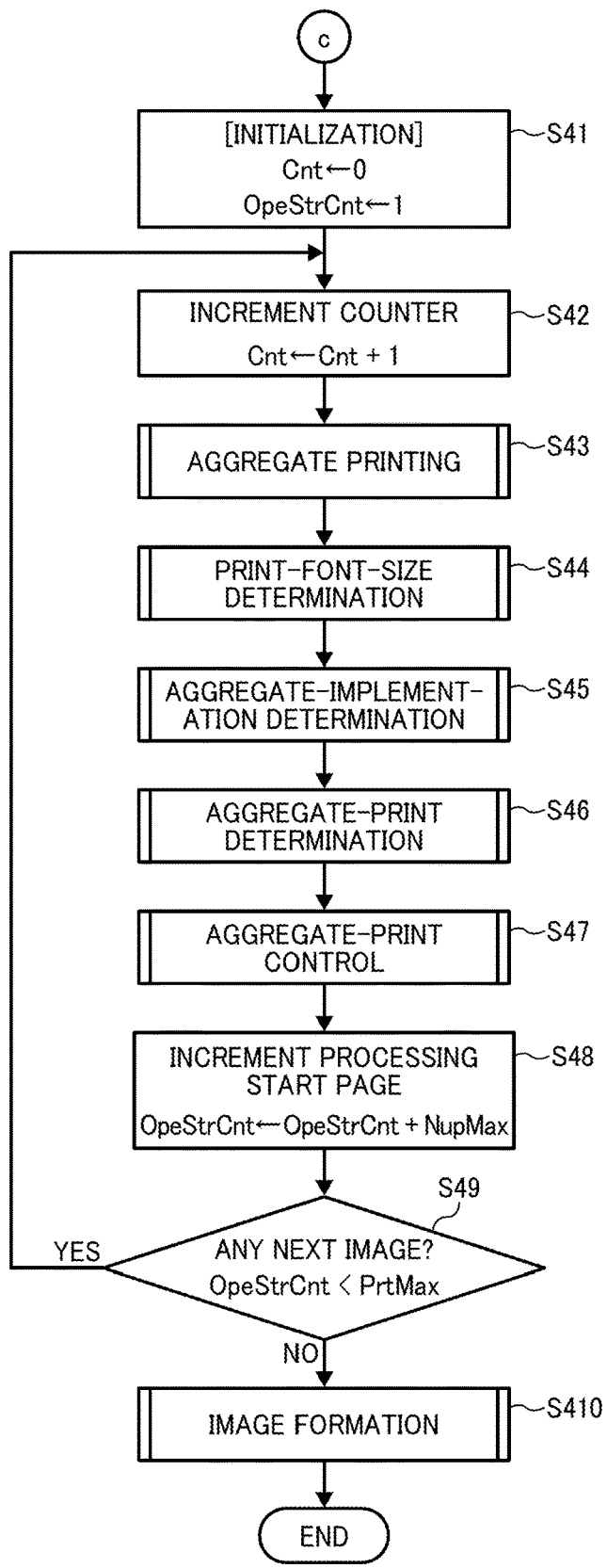
FIG. 6 is a flowchart illustrating a process of generating an aggregate print image.

The flowchart illustrated in FIG. 6 illustrates steps in a specific process performed by the aggregate-print processing unit (C), the print-font-size determining unit (F1), the aggregate-implementation determining unit (F2), the number-of-aggregated-pages determining unit (G), the aggregate-print control unit (H), and the image forming unit (A) illustrated in FIG. 2.

In initialization S41, Cnt, which is a counter for counting the number of pages of a document, and OpeStrCnt, which is a process start page counter, are initialized. In counter-increment processing S42, the counter Cnt is incremented by one in the beginning before aggregate printing is started.

In aggregate printing S43 performed by the aggregate-print processing unit (C), an image of [OpeStrCnt] page, held in the image accumulating unit (B2), serves as the first page, and three images including a non-aggregate image (the same as the first page), a two-page aggregate image, and a four-page aggregate image are generated and temporarily accumulated in the image accumulating unit (B2). When the number of images used in aggregation exceeds the maximum number of accumulated images, aggregation is performed using a white image with the same size as the accumulated image(s).

In print-font-size determination S44 performed by the print-font-size determining unit (F1), the smallest font size of each aggregate image is determined, and this value is held as "the smallest font size for printing". In aggregate-implementation determination S45 performed by the aggregate-implementation determining unit (F2), "the lower limit of the smallest font size for printing" held in the print-font-size-lower-limit setting unit (E) is compared with the above-mentioned "smallest font size for printing". It is determined that "aggregation is possible" when "the lower limit of the smallest font size for printing"<"the smallest font size for printing".

In aggregate-print determination S46 performed by the number-of-aggregated-pages determining unit (G), the greatest number of aggregated pages among those determined by the aggregate-implementation determining unit (F2) as "aggregation is possible" is set in NupMax. In aggregate-print control S47 performed by the aggregate-print control unit (H), an aggregate image having the greatest number of aggregated pages is left held in the image accumulating unit (B2), and all the other aggregate images and the accumulated images used in aggregation are discarded.

In process-start-page increment processing S48, the first page for which aggregate images will be generated next is calculated. When the process reaches the last page of the aggregate images in S49, the process ends. Otherwise, the process from step S42 onward is repeated. In image formation S410 performed by the image forming unit (A), an image is formed on recording paper using an electrophotographic method or an inkjet method.

Figure 7:
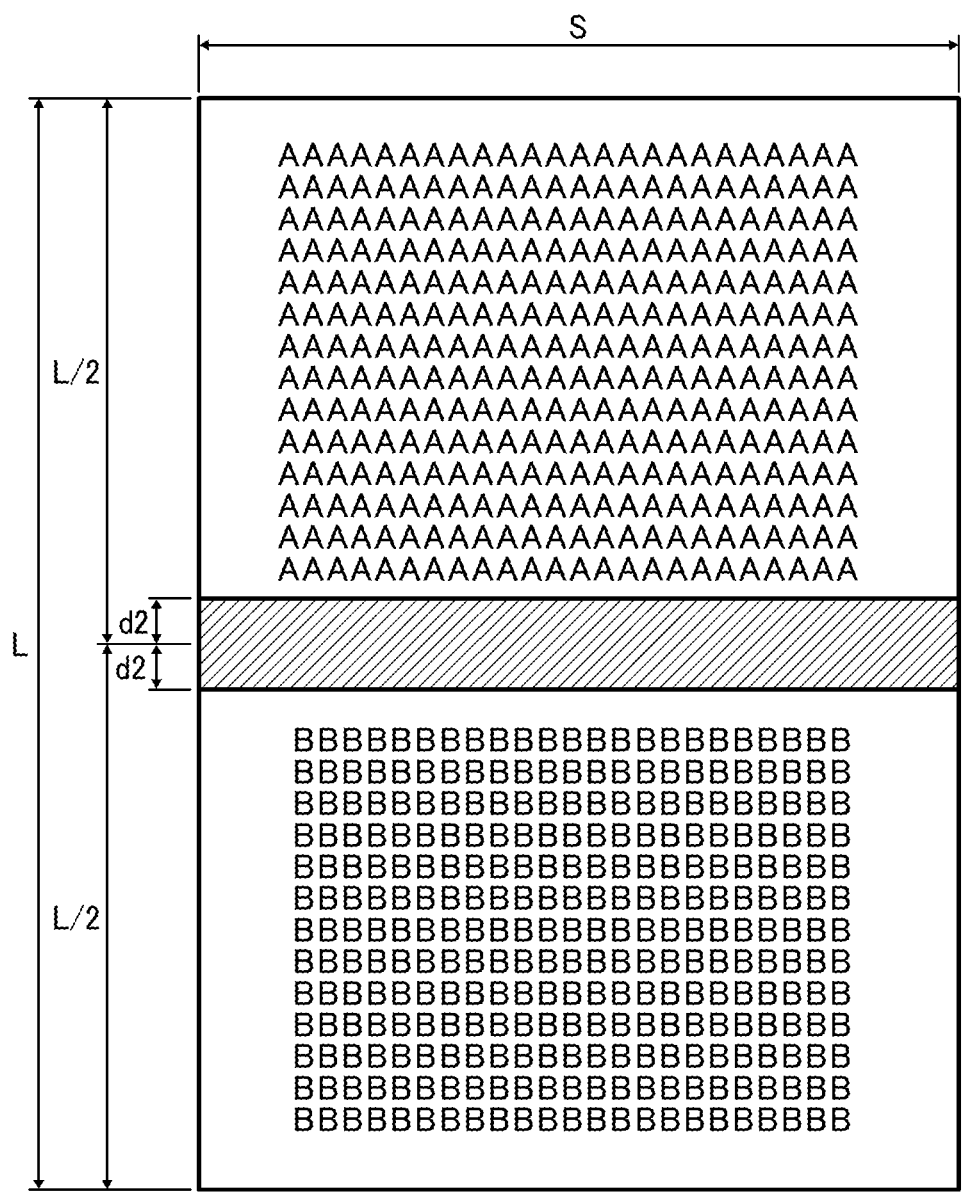
FIG. 7 is an illustration for describing a method for determining a two-page aggregate document, in the page splitting process.

Hereinafter, the details of S34 (aggregate document determination) in FIG. 5 will be described. Referring to FIG. 7, a method for determining a two-page aggregate document, in the page splitting process, will be described. The page splitting process described here can detect a two-page aggregate document and a four-page aggregate document. In the aggregate document determination, a determination area for detecting a two-page aggregate document is a shaded area in FIG. 7. The length of the long side of the document is denoted by L, and the length of the short side is denoted by S. A line corresponding to half the length of the long side (L/2) serves as the center line. A d2-rectangular area on both sides of the center line serves as the determination area. When a margin before aggregating one-page areas constituting a two-page aggregate document is denoted by d, the magnification at the time of aggregation is S/L×100%. Thus, the margin d2 of a two-page aggregate document is d2=d× S/L. The determination area in this case is a strip-shaped rectangular area having d2×2×S.

Figure 8:
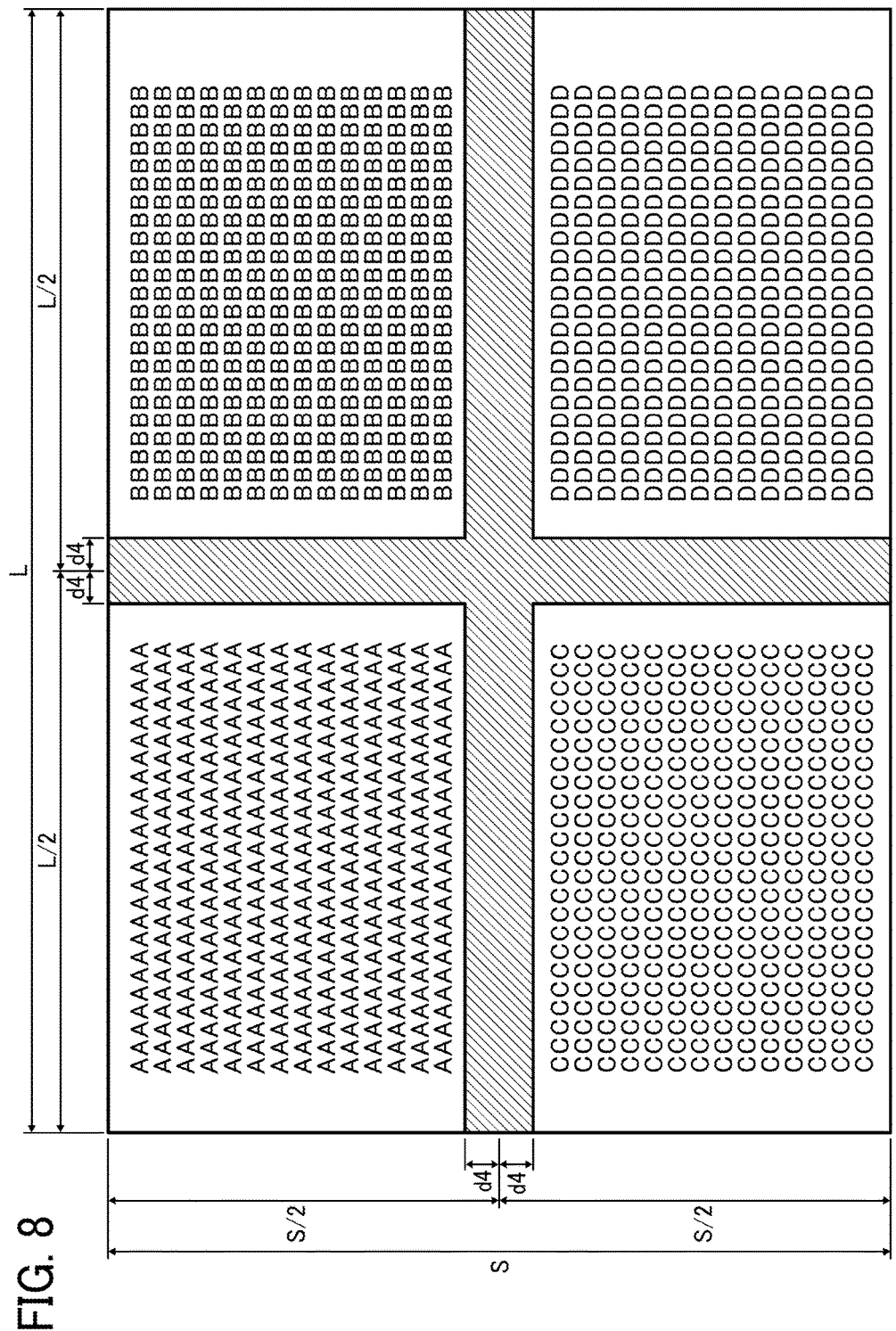
FIG. 8 is an illustration for describing a method for determining a four-page aggregate document, in the page splitting process.

Referring further to FIG. 8, a method for determining a four-page aggregate document, in the page splitting process, will be described. In the aggregate document determination, a determination area for detecting a four-page aggregate document is a shaded area in FIG. 8. The length of the long side of the document is denoted by L, and the length of the short side is denoted by S. A rectangular area within the range of d4 on both sides of half the length of the long side (L/2) and a rectangular area within the range of d4 on both sides of half the length of the short side (S/2) serve as a determination area. The magnification of a four-page aggregate document is 50%. When a document margin of a document prior to becoming an aggregate document (each page constituting an aggregate) is denoted by d, the margin in the case of a four-page aggregate document is d4=d×0.5.

Figure 9:
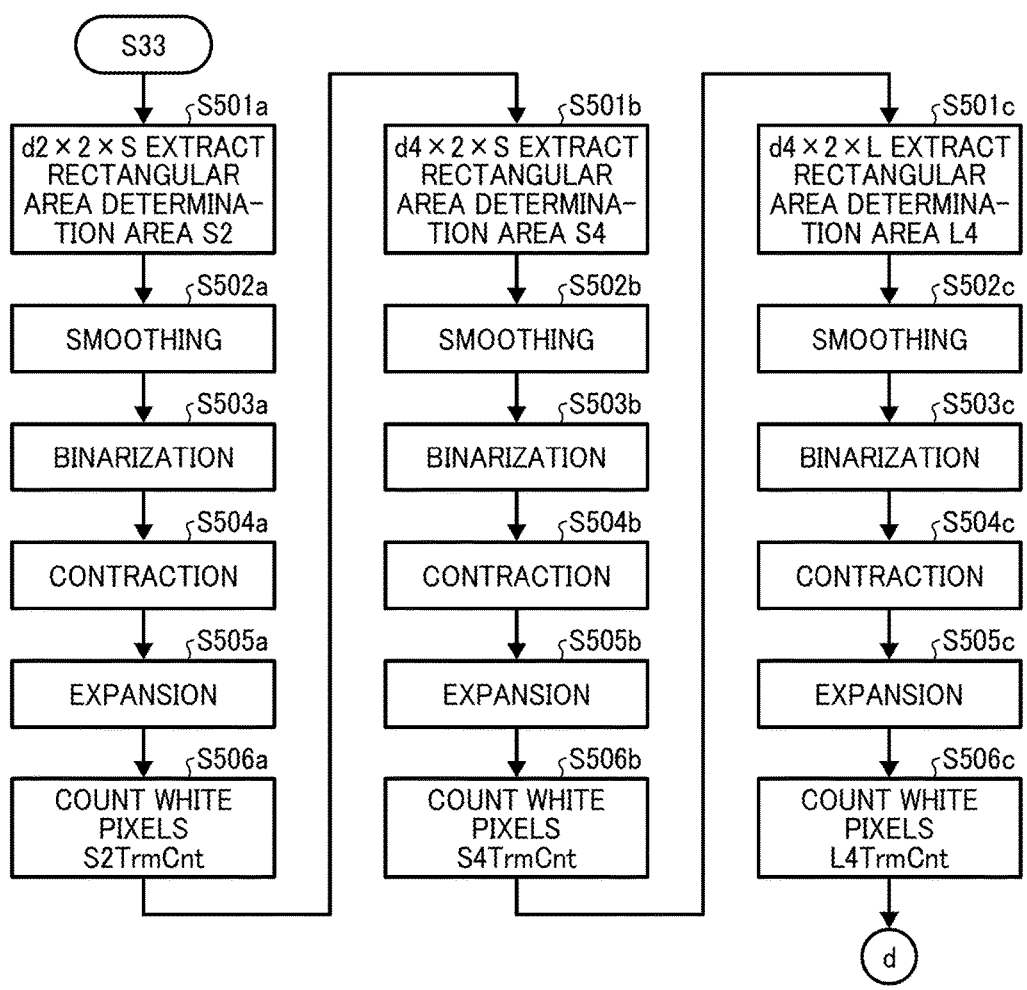
FIG. 9 is a flowchart illustrating a specific aggregate document determining process.
Figure 10:
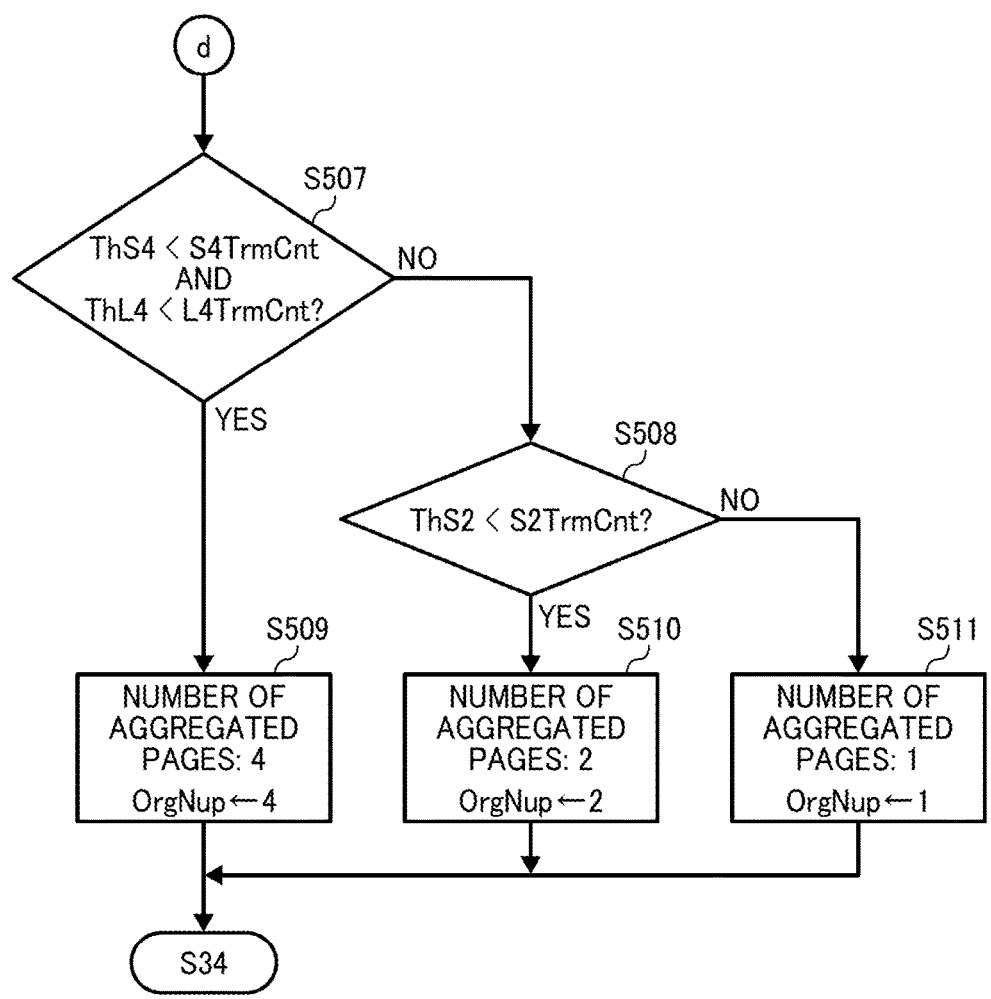
FIG. 10 is a flowchart illustrating the specific aggregate document determining process.

FIGS. 9 and 10 are flowcharts illustrating steps in a specific aggregate document determining process. In other words, FIGS. 9 and 10 illustrate steps in a process of detecting an aggregate document in the aggregate document determination. A threshold for determining a two-page aggregate document is denoted by ThS2. Thresholds for determining a four-page aggregate document are denoted by ThS4 and ThL4. Here, it is assumed that the thresholds are in a case in which more than 98% of the pixels of the entire determination area are white pixels. In short, in each determination area, "the number of pixels of the entire determination area"×0.98 serves as a setting value of each threshold.

In S501a, S501b, and S501c, the determination areas illustrated in FIGS. 7 and 8 are extracted, respectively. In S502a, S502b, and S502c, smoothing processing is performed to remove image noise in the respective determination areas. In S503a, S503b, and S503c, the smoothed images are binarized. In S504a, S504b, and S504c and in S505a, S505b, and S505c, contraction and expansion of black pixels is performed to remove isolated points caused by garbage unremoved by the smoothing processing. It may sometimes be effective to repeat the contraction and expansion several times. The numbers of white pixels in the expanded-and-contracted binarized images are counted, and these values are held in S2TrmCnt, S4TrmCnt, and L4TrmCnt, respectively (S506a, S506b, and S506c).

In S507 (FIG. 10), it is determined whether the document is a four-page aggregate document that satisfies a first conditional expression ThS4<S4TrmCnt and ThL4<L4TrmCnt. If the first condition is satisfied ("YES" at S507), it is determined that the document is an aggregate document whose number of aggregated pages is four (S509). If the first condition is not satisfied ("NO" at S507), it is determined whether a second conditional expression ThS2<S2TrmCnt in S508 is satisfied. If the second condition is satisfied ("YES" at S508), it is determined that the document is an aggregate document whose number of aggregated pages is two (S510). If neither the first condition nor the second condition is satisfied ("NO" at S511), it is determined that the document is not an aggregate document, and the number of aggregated pages is one (S511).

Figure 11:
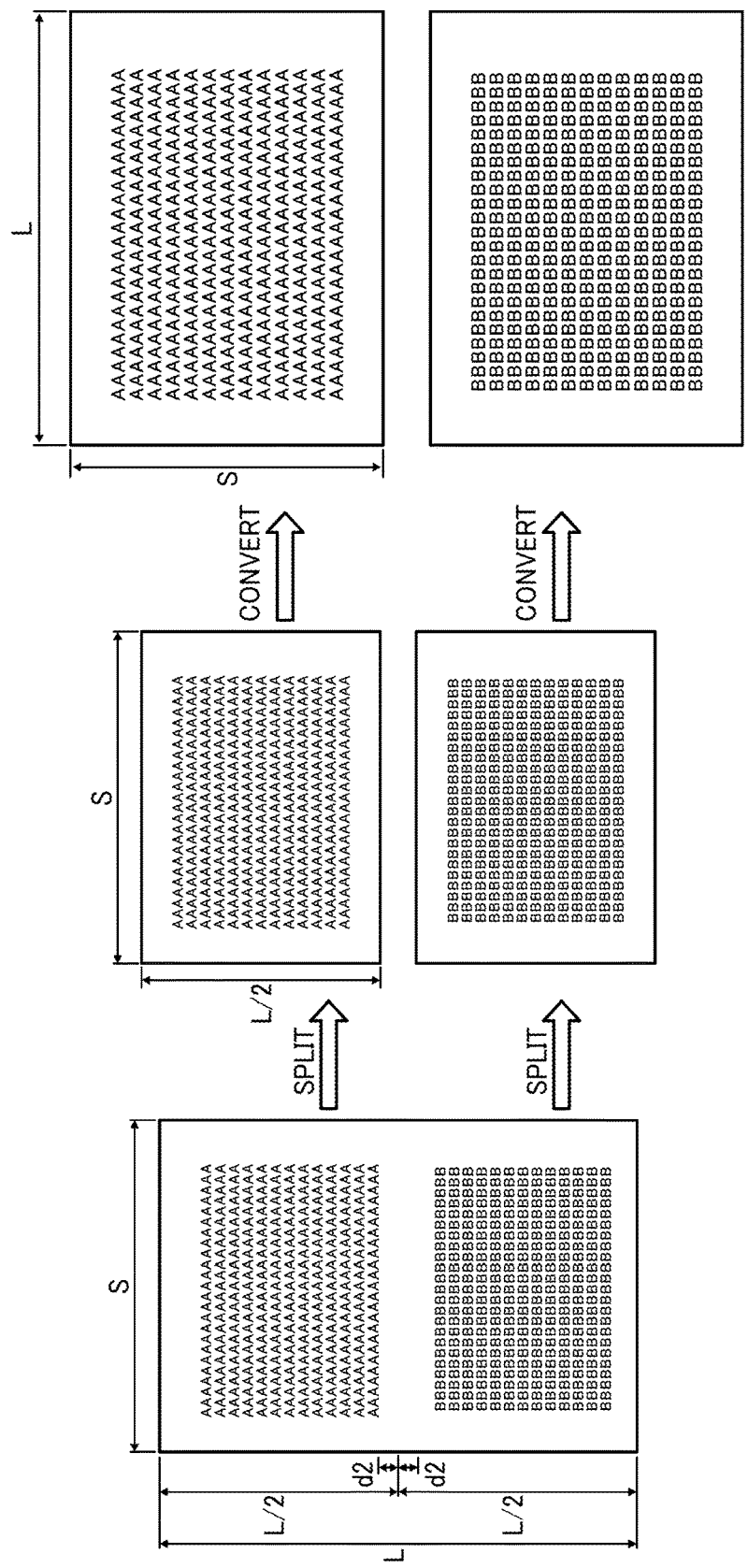
FIG. 11 is an illustration for describing an image splitting process performed in a two-page splitting process.
Figure 12:
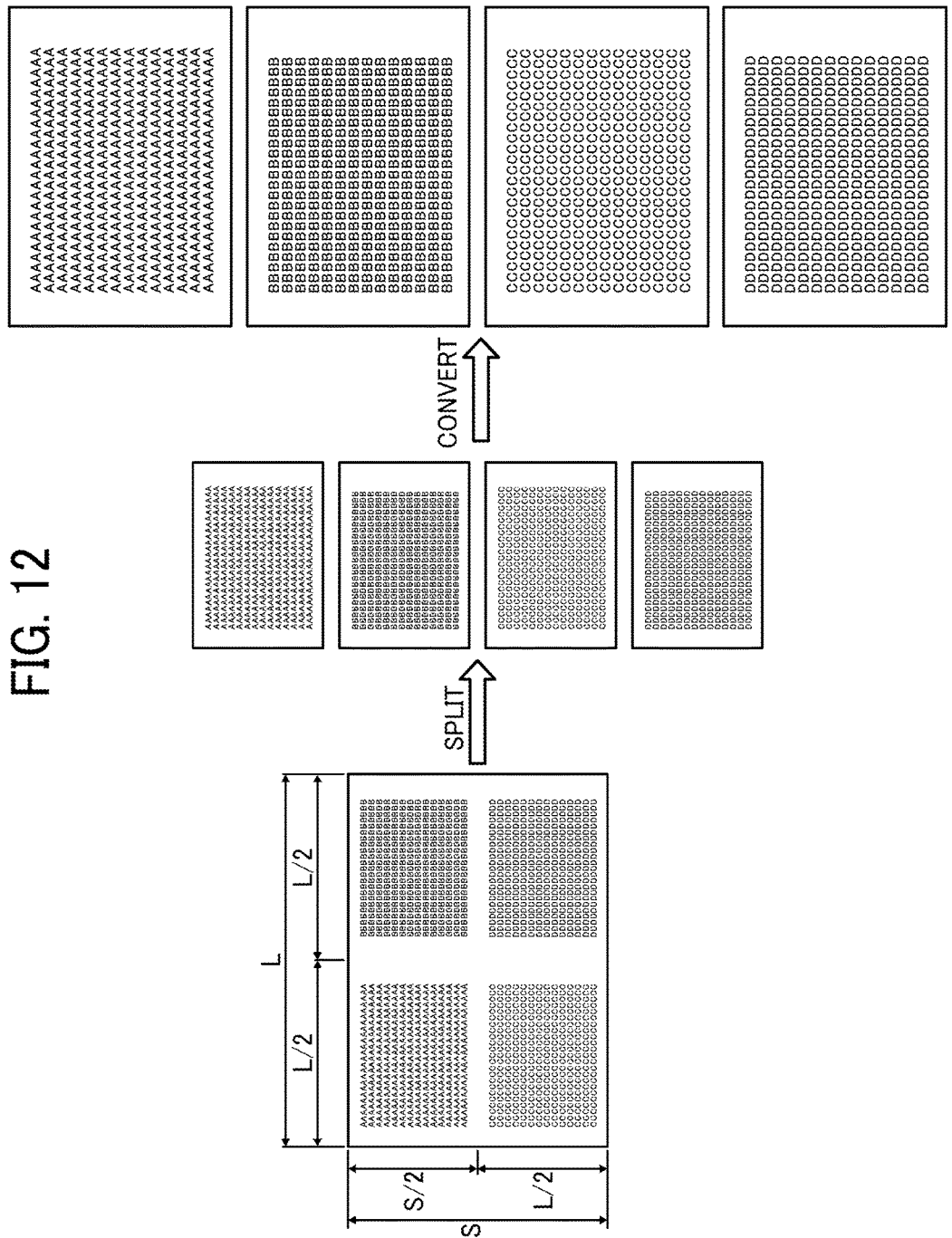
FIG. 12 is an illustration for describing an image splitting process performed in a four-page splitting process.

Next, the details of S36 (aggregate image splitting) in FIG. 5 will be described. FIGS. 11 and 12 are illustrations each describing an image splitting process performed in the page splitting process.

FIG. 11 illustrates an image splitting process performed when it is determined by the aggregate document determination that the document is a two-page aggregate document. The document determined to be a two-page aggregate document is subjected to image splitting at half the length of the long side. The split images are magnified such that the images can be treated in the same manner as the case of scanning a one-page document. Here, magnification is performed with a magnification of L/S*100[%] such that the short side after the splitting has the same length as the long side of the original image.

FIG. 12 illustrates an image splitting process performed when it is determined by the aggregate document determination that the document is a four-page aggregate document. The document determined to be a four-page aggregate document is subjected to image splitting at half the length of the long side and of the short side. The split images are magnified such that the images can be treated in the same manner as the case of scanning a one-page document. Here, magnification is performed with a magnification of 200% such that the long side and the short side after the splitting are doubled.

Figure 13:
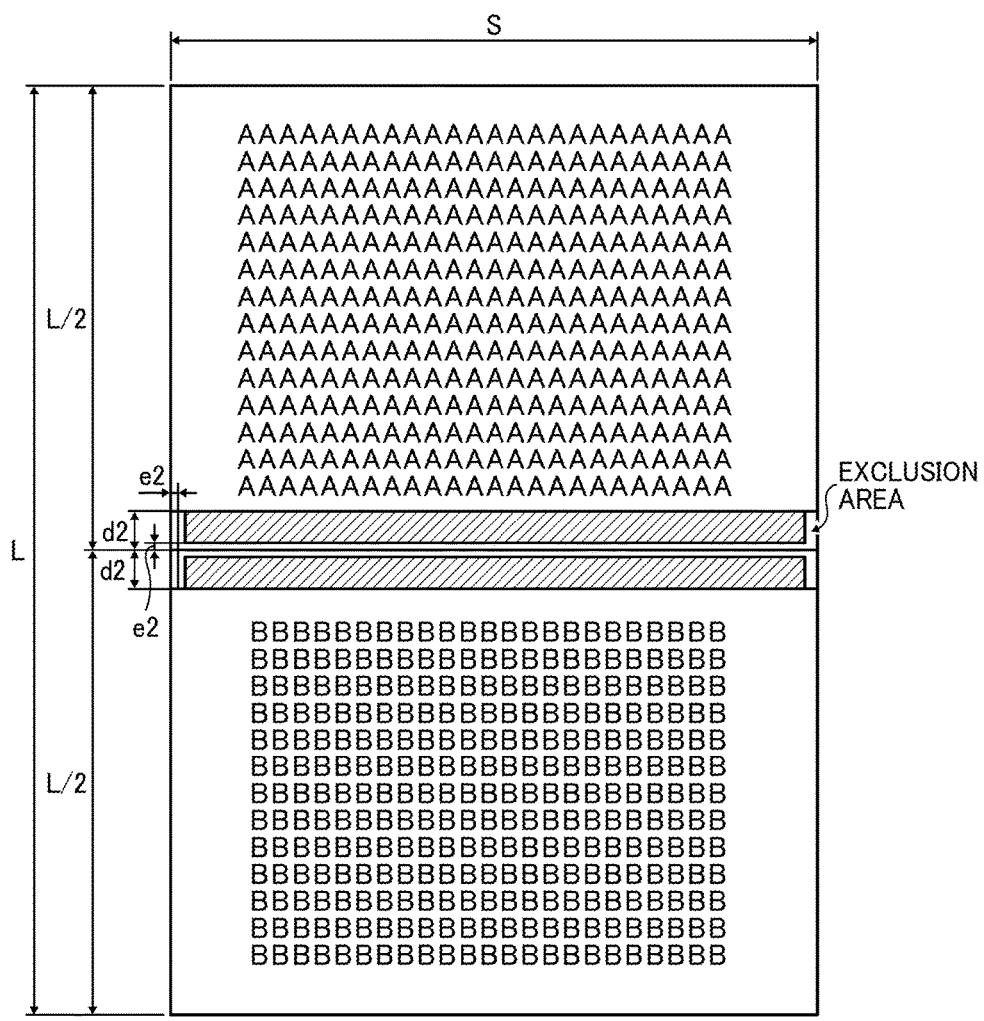
FIG. 13 illustrates an exclusion area in a determination area in the case of two-page contraction.

At the time of determining that the document is an aggregate-printed image, it is preferable to provide an exclusion area in the determination area. FIG. 13 illustrates an exclusion area in the determination area in the case of two-page contraction, and FIG. 14 illustrates an exclusion area in the determination area in the case of four-page contraction.

In the determination area illustrated in FIG. 7, a shaded area obtained by excluding the exclusion area illustrated in FIG. 13 newly serves as a determination area. When an exclusion width serving as a calculation reference is denoted by e, in the case of detecting a two-page aggregate document, the exclusion width e2=e×"size reduction ratio at the time of aggregating document pages"=e×S/L is calculated. For example, in the case of an A4 document, given e=5 mm, then e2=5 mm×210/297=3.5 mm, and an area with an exclusion width of 7 mm is excluded.

In the determination area illustrated in FIG. 8, a shaded area obtained by excluding the exclusion area illustrated in FIG. 14 newly serves as a determination area. When an exclusion width serving as a calculation reference is denoted by e, in the case of detecting a four-page aggregate document, the exclusion width e2=e×"size reduction ratio at the time of aggregating document pages" =e×1/2 is calculated. For example, in the case of an A4 document, given e=5 mm, then e2=5 mm×0.5=2.5 mm, and an area with an exclusion width of 5 mm is excluded.

The technical significance of the exclusion areas illustrated in FIGS. 13 and 14 resides in improvement of the detection accuracy. In many cases, a document end portion of a scanned image is shaded. Reduction in detection accuracy caused by this shade can be prevented. A line or a broken line may be used as a break of a document area in an aggregate document. Reduction in detection accuracy caused by this line or broken line can also be prevented.

Figure 16B:
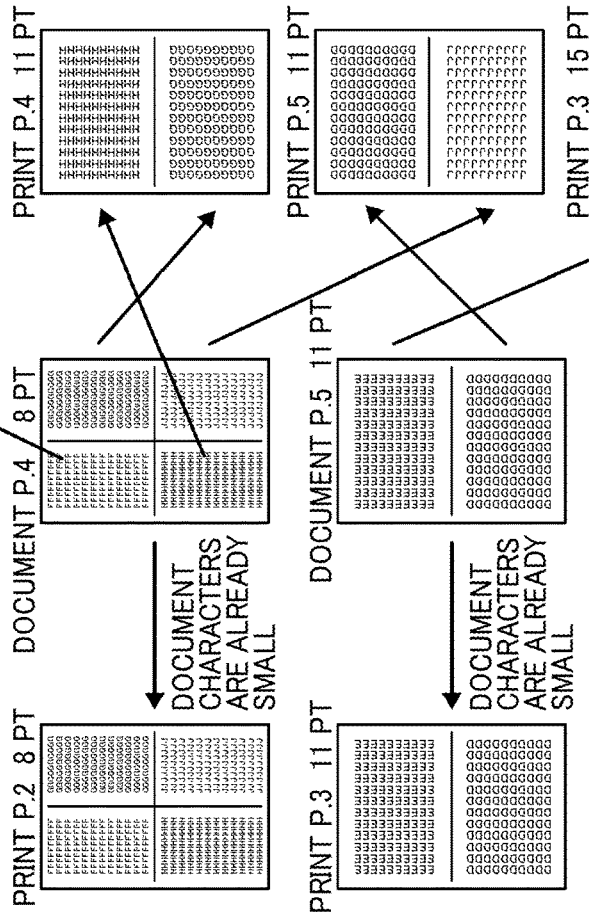

FIGS. 15 and 16 illustrate differences in output between the embodiment and the related art. Because the related art is based on the assumption that the smallest font size of a document is larger than the lower limit of the font size for printing, if the document is an aggregate document, there is no other choice but to print the document as it is. In other words, a conventional image forming apparatus configured to determine whether to implement aggregate printing merely performs this determination based on the font size for printing. Specifically, aggregate printing is controlled such that the size of printed characters in an aggregate print does not become smaller than the lower limit of a printing font size determined in advance by the user.

However, when a scanned one-page document is already in an aggregate-printed state where characters are already small, the characters will not become easier to read. In the embodiment, an aggregate document is split into pieces and then the pieces are again aggregated. In doing so, the characters become larger and thus easier to read. Even if an aggregate document is split into pieces and if the font size for printing is smaller than the lower limit of the font size for printing, characters become larger than when printed in an aggregated state. Thus, the characters become easier to read. In short, characters on an aggregate-printed document where small characters are printed are made easier to read.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

For example, the above-described operation of aggregating the split image data based on a font size of one or more characters, may be performed by an information processing apparatus functioning as a server, which communicates with the outside image forming apparatus including a scanner and a printer.

In another example, a determination of whether to aggregate the split image data may not only be made based on a font size of one or more characters included in the split image data, but also based on basother factors related to the image of the document in addition to the font size of one or more characters.

The invention claimed is:

1. An image processing apparatus comprising:
    an image scanner configured to scan an image of a document into image data; and
    circuitry configured to:
        split the image data into a plurality of areas to generate split image data;
        magnify the split image data;
        aggregate the magnified split image data, at least based on a font size of one or more characters included in the split image data;
        accumulate font sizes of one or more characters included in the split image data according to the number of aggregated pages of the split image data; and
        aggregate, when each font size is larger than a font size lower limit set in advance, the magnified split image data based on one of the font sizes having a value that is the closest to the font size lower limit, and
        wherein the circuitry is configured to set the font size in advance.

2. The image processing apparatus of claim 1, wherein the circuitry is further configured to
    determine whether the image data is aggregate document data based on a specific area of the image data, the specific area including a center line of the image data, and
    based on a determination indicating that the image data is aggregate document data, split the image data into the areas whose number is determined based on a ratio of a number of white pixels in the specific area of the image data to the specific area of the image data, to generate the determined number of split image data.

3. The image processing apparatus of claim 1, wherein the circuitry is further configured to
    determine a magnification based on the number of the areas obtained by splitting the image data, and
    magnify the split image data with the determined magnification such that the magnified split image data corresponds to one page of document data.

4. The image processing apparatus of claim 1, wherein the circuitry is configured to
    determine whether a size of one or more characters included in the split image data is larger than a lower limit, and
    aggregate the split image data into print data to be printed, based on a determination indicating that the size of one or more characters included in the split image data is larger than the lower limit.

5. The image processing apparatus of claim 4, further comprising:
    an image forming device configured to form an image based on the printed data.

6. An image processing method comprising:
    scanning an image of a document into image data;
    splitting the image data into a plurality of areas to generate split image data;
    magnifying the split image data;
    aggregating the magnified split image data, at least based on a font size of one or more characters included in the split image data;
    accumulating font sizes of one or more characters included in the split image data according to the number of aggregated pages of the split image data;
    aggregating, when each font size is larger than a font size lower limit set in advance, the magnified split image data based on one of the font sizes having a value that is the closest to the font size lower limit; and
    setting the font size in advance.

7. The image processing method of claim 6, further comprising:
  determining whether the image data is aggregate document data based on a specific area of the image data, the specific area including a center line of the image data,
  wherein, when the determining determines that the image data is aggregate document data, the splitting splits the image data into the areas whose number is determined based on a ratio of a number of white pixels in the specific area of the image data to the specific area of the image data, to generate the determined number of split image data.

8. The image processing method of claim 6, further comprising:
  determining a magnification based on the number of the areas obtained by the splitting of the image data, wherein the magnifying magnifies the split image data with the determined magnification such that the magnified split image data corresponds to one page of document data.

9. The method of claim 6, further comprising:
  determining whether a size of one or more characters included in the split image data is larger than a lower limit,
  wherein the aggregating the magnified split image data includes aggregating the split image data, when the determining determines that the size of one or more characters included in the split image data is larger than the lower limit.

10. A non-transitory recording medium which, when executed by one or more processors, cause the processors to perform an image processing method comprising:
  scanning an image of a document into image data;
  splitting the image data into a plurality of areas to generate split image data;
  magnifying the split image data;
  aggregating the magnified split image data, at least based on a font size of one or more characters included in the split image data;
  accumulating font sizes of one or more characters included in the split image data according to the number of aggregated pages of the split image data; and
  aggregating, when each font size is larger than a font size lower limit set in advance, the magnified split image data based on one of the font sizes having a value that is the closest to the font size lower limit, and
  setting the font size in advance.

11. The recording medium of claim 10, wherein the method further comprises:
  determining whether the image data is aggregate document data based on a specific area of the image data, the specific area including a center line of the image data,
  wherein, when the determining determines that the image data is aggregate document data, the splitting splits the image data into the areas whose number is determined based on a ratio of a number of white pixels in the specific area of the image data to the specific area of the image data, to generate the determined number of split image data.

12. The recording medium of claim 10, wherein the method further comprises:
  determining a magnification based on the number of the areas obtained by the splitting of the image data, wherein the magnifying magnifies the split image data with the determined magnification such that the magnified split image data corresponds to one page of document data.

13. The recording medium of claim 10, wherein the method further comprises:
  determining whether a size of one or more characters included in the split image data is larger than a lower limit,
  wherein the aggregating the magnified split image data includes aggregating the split image data, when the determining determines that the size of one or more characters included in the split image data is larger than the lower limit.

* * * * *